United States Patent [19]

Erlichman

[11] Patent Number: 4,603,337

[45] Date of Patent: Jul. 29, 1986

[54] THERMAL TRANSFER RECORDING MEDIUM

[75] Inventor: Irving Erlichman, Wayland, Mass.

[73] Assignee: Polaroid Corporation, Cambridge, Mass.

[21] Appl. No.: 717,122

[22] Filed: Mar. 28, 1985

[51] Int. Cl.[4] .............................................. G01D 15/10

[52] U.S. Cl. ................................ 346/76 PH; 346/105; 400/120

[58] Field of Search ............. 346/76 PH, 76 R, 135.1, 346/105, 162-164, 227; 219/216 PH; 400/120, 124, 241-241.4; 355/83; 101/473, DIG. 24

[56] References Cited

U.S. PATENT DOCUMENTS

| | | | |
|---|---|---|---|
| 3,289,574 | 12/1966 | Block | 101/473 |
| 3,905,876 | 9/1975 | Yoshino et al. | 204/2 |
| 3,951,757 | 4/1976 | Yoshino et al. | 204/2 |
| 4,133,933 | 1/1979 | Sekine et al. | 428/328 |
| 4,195,937 | 4/1980 | Baran | 346/76 PH |
| 4,329,071 | 5/1982 | Applegate et al. | 400/120 |
| 4,345,845 | 8/1982 | Bohnhoff et al. | 400/120 |
| 4,458,253 | 7/1984 | Goff | 346/76 |
| 4,470,714 | 9/1984 | Aviramm et al. | 400/241 |
| 4,477,198 | 10/1984 | Bowids et al. | 400/120 |

FOREIGN PATENT DOCUMENTS

| | | | |
|---|---|---|---|
| 0082284 | 7/1979 | Japan | 346/76 PH |
| 1275929 | 6/1972 | United Kingdom | 346/76 R |

OTHER PUBLICATIONS

IEEE 1980 vol. ED-27 No. 1 Jan. 80 "Thermal Ink--Transfer Imaging" by Tokunaga et al pp. 218-222.

"Thermal Transfer Printer Employing Special Ribbons Heated with Current Pulses", IBM Technical Disclosure Bulletin, vol. 18, No. 8, 1/76 p. 2695.

"Electro-Thermosensitive Recording Sheets" by W. Shimotsuma et al, Tappi, 10/76 vol. 59, No. 10, pp. 92 and 93.

*Primary Examiner*—Art Evans

*Attorney, Agent, or Firm*—John S. Vale

[57] ABSTRACT

A thermal transfer ribbon including a resistive heating element layer having a thermally transferable ink layer on the front side thereof is provided with a thermally sensitive indicator layer on the back side thereof. Heat generated in the resistive layer fuses the ink which transfers selectively to record grey scale image defining dots of various sizes on an ink receiving sheet in contact with the ink layer. The heat generated in the resistive layer also flows to the indicator layer to form corresponding indicator marks which are proportional to the recorded dots. The indicator marks are visible on the back side of the ribbon and are optionally monitored to provide feed back to a thermal system for accurately controlling the density of pixel area defining the recorded image.

11 Claims, 5 Drawing Figures

THERMAL TRANSFER RECORDING MEDIUM

RELATED APPLICATION

This application is related to commonly assigned application, now U.S. Pat. No. 4,556,892 filed on even date herewith by Irving Erlichman and entitled "Thermal Transfer Recording System and Method".

BACKGROUND OF THE INVENTION

The present invention relates to the field of thermal printing or recording and, more specifically, to a thermal transfer ribbon for use in recording a tonal or grey scale image on an ink receiving sheet.

Commonly assigned, copending applications U.S. Ser. Nos. 676,502; 685,714; and what is now U.S. Pat. No. 4,547,784 are directed to closed loop systems and methods for thermally recording a tonal or grey scale image, defined by electronic image signals, on a thermal paper or transparency material which includes an integral thermally sensitive recording layer.

The recorded image is defined by a matrix array of minute pixel areas, each of which has a desired or target density or tone specified by the image signals. Pixel area tone is varied by varying the size of a dot recorded therein in a manner analogous to half-tone lithographic printing.

The nature of the thermally sensitive recording layer is such that dot size progressively increases with increased amounts of thermal energy applied to form the dot. To precisely control dot size, the thermal recording systems disclosed in the above-noted applications employ a closed loop control system in which a dot is optically monitored with a photodetector during formation to determine pixel density. This information is fed back to the control system where it is compared to a signal indicative of target density. Based on this comparison, the control system regulates the application of thermal energy to progressively incease dot size until a predetermined comparison value is achieved. Thereafter, the application of thermal energy is terminated.

The key to achieving precise control over pixel density is to configure the recording system so that the optical monitoring means, i.e. the photodetector, has an unobstructed field of view of dot information to provide the necessary feed back.

If the recording medium is a thermal paper having an opaque base sheet, thermal energy preferably is applied with a thermal print head from the back side of the paper through the base to form dots in the recording layer on the front side where dot formation may be monitored without obstruction by the print head, as disclosed in the previously mentioned application U.S. Ser. No. 676,502. For transparency materials, the heat is applied with the print head through a light reflective buffer sheet in engagement with the recording layer on the front side, and dot formation is monitored from the back side with a photodetector that looks through a transparent base film to read the reflected light level of the recording layer where a dot is being formed as disclosed in previously mentioned applications U.S. Ser. Nos. 685,714 and 685,715.

In contrast to recording on a thermally sensitive medium that includes an integral thermally sensitive recording layer, another thermal recording method known in the prior art utilizes a thermal transfer ribbon. The ribbon includes a fusible ink or marking layer coated on one side of a flexible base layer or film. The ribbon is placed in contact with an ink receiving sheet, e.g., a plain sheet of paper, with the ink layer in facing relation to the receiving sheet. The base is then selectively heated from the back side. In those areas where the temperature is raised sufficiently to fuse or liquefy the ink, ink transfer occurs to form a mark or dot on the paper.

A major advantage of this type of recording system is that it employs common, inexpensive paper as the receiving sheet and does not require the use of an expensive special purpose thermal paper.

To achieve high quality tonal image recording utilizing thermal transfer techniques, it is essential to precisely control pixel density (dot dize). Therefore, it would be highly desirable to incorporate the dot monitoring and feed back control concept into a thermal transfer image recording system.

Some thermal transfer systems known in the prior art utilize a resistive element print head which heats up in response to a passage of current therethrough. The head is engaged with the back side of the ribbon and applies thermal energy which flows through the base and fuses the ink to effect transfer. Dot formation is not visible for monitoring purposes because it occurs between the opaque receiving paper and the ribbon which also generally is opaque. But, even if dot formation was visible from the back side of the ribbon, the overlying print head would block any opportunity to monitor dot formation with a photodiode for feed back purposes.

Before the feed back control concept can be integrated into a thermal transfer recording system, it will be necessary to solve two problems. First, there must be a visual indication of ink transfer or dot size that is accessible from the back side of the ribbon for monitoring purposes. And secondly, the optical path between the visual indication and the photodetector must not be obscured or blocked by any component that acts on the backside of the ribbon to generate heat therein.

As an alternative to selectively heating a thermal transfer ribbon with an external thermal energy applying device, such as a resistive element print head, some thermal ink ribbons known in the prior art include within their multi-layered structure an electrically resistive layer that serves an internal heating element. In operation, recording signal voltage is applied between a pair of spaced apart electrodes which are in contact with the back side of the ribbon. This causes a current to flow in the resistive layer between the electrode sites. The current flow generates heat in the resistive layer which in turn is transmitted to the ink layer to effect transfer.

For representative examples of resistive layer thermal transfer ribbons, and thermal recording systems and components configured for use therewith, reference may be had to U.S. Pat. Nos. 4,477,198; 4,470,714; 4,458,253; 4,345,845 and 4,329,071. Also see "Thermal Transfer Printer Employing Special Ribbons Heated With Current Pulses", IBM Technical Disclosure Bulletin, Vol. 18, No. 8, January 1976, page 2695.

Above noted U.S. Pat. No. 4,345,845 is directed to a feed back control system for driving the electrodes with a voltage source rather than a constant current driver. The system utilizes as feed back an electrical signal representative of internal ribbon voltage at the print point. However, the disclosure does not contemplate providing a visual indicator that is representative of or proportional to pixel density or dot size.

It is also known to provide an integral resistive layer in an electro-thermal recording sheet for use in facsimile devices. Typically, such a sheet comprises a base or support layer made of paper, a conductive layer, on the base layer, having sufficient resisitvity to produce joule heating in response to current flow therethrough, and a heat sensitive recording layer, which is also somewhat electrically conductive, coated on top of the heat producing conductive layer. Recording signal voltage is applied between spaced electrodes in contact with the top recording layer. The relative resistivity values of the recording and conductive layers are such that current flows from a first electrode through the recording layer to the underlying conductive layer, sideways along the conductive layer towards the second electrode, and then back through the recording layer to the second electrode. The current flow in the conductive layer generates heat which flows upwardly to the recording layer thereabove and causes heat sensitive dyes therein to change color or tone to produce a visible mark or dot.

Representative examples of recording sheets having an internal conductive heating layer overcoated with a conductive and thermally reactive recording layer may be found in U.S. Pat. Nos. 4,133,933; 3,951,757; and 3,905,876 as well as in a paper entitled "Electro-thermo Sensitive Recording Sheets" by W. Shimotsuma et al, Tappi, October 1976. Vol. 59, No. 10, pages 92 and 93.

One advantage of incorporating a resistive heating layer into a thermal transfer ribbon or a thermal recording paper is that the recording signals are applied with spaced apart electrodes which may be configured so that the recorded dot is formed in an area that is aligned with the space between the two electrodes. Because the space is not blocked by a conventional external print head, it has the potential to serve as a "window" for optically monitoring an indicator of dot formation or ink transfer.

As noted earlier, in the interest of substantially improving the quality of tonal images produced by thermal transfer recording, it is highly desirable to incorporate dot formation monitoring and feed back control into the recording system. However, applying this technique is inhibited by the fact that thermal transfer ribbons known in the art do not provide a visual indication of dot formation or ink transfer on the back side of the ribbon to allow optical monitoring and feed back.

Therefore, it is an object of the present invention to provide a thermal transfer medium, e.g. a thermal transfer ink ribbon, that is specially configured to improve the quality of thermal transfer recording of a tonal or grey scale image on an image receiving sheet.

Another object is to provide such a thermal transfer medium which is adapted for use in a thermal transfer recording system which employs optical monitoring and feed back to more accurately control recorded dot size or pixel density.

Yet another object is to provide a thermal transfer ribbon which includes a fusible ink layer on one side of the ribbon, and a visual indicator of ink transfer and/or dot formation on an opposite side of the ribbon.

Another object is to provide such a thermal transfer ribbon which includes an intregal resistive heating layer that generates heat, in response to the passage of current therethrough, for the dual purposes of fusing the ink on one side of the ribbon and activating a thermally sensitive visual indicator on the other side of the ribbon.

Other objects of the invention will, in part, be obvious and will, in part, appear hereinafter.

SUMMARY OF THE INVENTION

The present invention provides a thermal transfer medium, preferably in the form of a ribbon, which is specially configured for use in a thermal transfer image recording system that utilizes dot size or pixel density monitoring and a feed back control to improve the quality of a recorded tonal or grey scale image.

The thermal transfer ribbon embodying the present invention comprises as essential elements; a thermally transferable ink layer, a thermally sensitive indicator layer; and a resistive heating element layer, even though the ribbon structure optionally may include one or more additional layers.

The function of the resistive layer is to generate thermal energy in response to electric current flow therein. It is located between and in thermally conductive relation to the ink and indicator layers on opposite sides thereof. When thermal energy is generated in the resistive layer, it flows both to the ink layer for activating ink by changing it from a non-transferable state to a transferable state, and to the indicator layer to form, in a corresponding or aligned portion thereof, an optically detectable indication that is proportional to ink activation in the ink layer on the opposite side of the ribbon.

Typically, the ink layer is on the front side of the ribbon structure and is adapted to be placed in contact with an ink receiving image recording sheet, e.g. a sheet of plain white paper. The indicator layer is on the back side of the ribbon, and the resistive layer is located in the middle portion of the ribbon structure between the ink and indicator layers.

Preferably, the indicator layer is also somewhat electrically conductive so that image recording signals, applied between a pair of spaced apart electrodes in contact with the indicator layer, causes heat generating current to flow in that portion of the resistive layer between the two electrodes. The generated heat causes the ink on the front side to fuse or melt and transfer to the paper, and also causes the formation of an optically detectable indicator mark in the indicator layer between the two electrodes. The indicator mark is proportional to ink activation and therefor provides an indication of dot size or pixel density formed on the receiving sheet by the transfer of ink. The indicator mark is monitored with a photodetector which produces a monitored pixel density signal that is fed back to a recording transfer control system where it is compared to a target or desired density signal. Based on the comparison, the system regulates further application of heat generating current to the resistive layer until a determined comparison value is achieved, whereupon application of current is terminated.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

Figure 1:
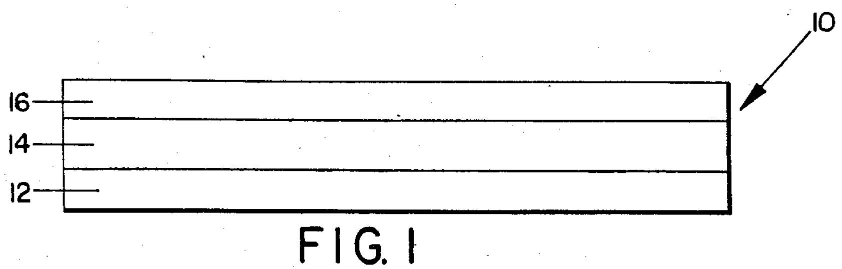
FIG. 1 is an elevational view of a thermal transfer recording medium embodying the present invention in the form of a thermal transfer ribbon.

A thermal transfer medium embodying the present invention is diagrammatically illustrated in FIG. 1 in the form of a thermal transfer ribbon 10. Ribbon 10 is a multi-layer structure or laminate comprising from bottom to top, a thermally transferable ink layer 12; an electrically resistive heating element layer 14; and a thermally sensitive and electro-conductive indicator layer 16.

Figure 2:
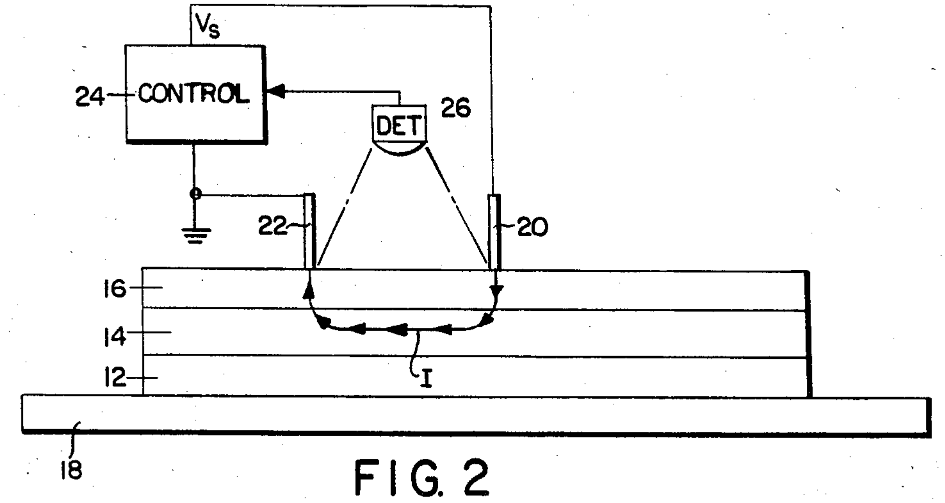
FIG. 2 is an elevational view showing the front side of the ribbon in engagement with a recording sheet and a diagrammatic representation of a control system having a pair of electrodes in engagement with the back side of the ribbon.

In FIG. 2, the ribbon is shown located in operative contact with an ink receiving image recording sheet 18 which may take the form of a plain sheet of white or colored paper, or any other sheet material that is capable of receiving ink thermally transferred from layer 12.

For descriptive purposes only, in this specification the ink layer side of ribbon 10, which is configured to engage sheet 18, shall be designated the front side. Thus, the indicator layer 16 is on the back side of ribbon 10, and resisitive layer 14 is disposed in a middle portion of the ribbon laminate between the front layer 12 and the back layer 16.

To effect ink transfer, the indicator layer 16 is contacted with a pair of spaced apart electrodes 20 and 22. The amount of space between the electrodes generally is determined by the maximum size of a dot or mark to be recorded on sheet 18. For 200 dots per inch resolution, maximum dot size is approximately 0.005 inches and the electrodes 20 and 22 would be spaced accordingly.

The first or signal applying electrode 20 is electrically connected to a recording signal output terminal of a diagrammatically illustrated control subsystem 24 of a later to be described thermal transfer image recording system. The output terminal supplies a recording volage signal designated $V_s$. The second or counter electrode 22 is connected to or set at a common ground potential with respect to a return path terminal of subsystem 24.

In response to the application of recording signals $V_s$, a current flow path is established through the ribbon structure from electrode 20 through the conductive indicator layer 16 to the underlying resistive layer 14; along layer 14 toward counter electrode 22; and then through layer 16, once again, to counter electrode 22 as indicated by a current flow path indicating line I having current flow directional arrowheads therealong.

The flow of current through that portion of resistive layer 16 between electrodes 20 and 22 generate heat in this area. Layer 14 is in thermally conductive relation to layers 12 and 14, and heat is transmitted both upwardly and downwardly to cause thermally activated reactions in aligned portions of layers 12 and 16 on opposite sides of layer 14.

In response to heat input from layer 14, the ink in a facing portion of layer 12 fuses or changes from a solid to a liquid state to effect transfer to sheet 18. Simultaneously, a portion of the generated heat is transmitted to indicator layer 16 causing activation of thermally sensitive dyes therein which change color to provide an optically detectable dot or mark on the backside of ribbon 10 that is proportional to the size of a dot or the density of a pixel area formed on sheet 18 by the transfer of ink from layer 12.

Ribbon 10 incorporates the indicator layer to provide a visual or optically detectable mark that is sensed by an optical monitoring device such as diagrammatically illustrated photodetector 26. Preferably, photodetector 26 measures the level of light reflected from that portion of layer 16 between electrodes 20 and 22 and feeds this information back to control subsystem 24 where it is used to more precisely control dot size in a manner that will be explained in detail later.

The ribbon structure embodying the present invention has several advantages. First, it provides an indication of dot formation on the back side of the ribbon where it is accessible for monitoring. This is necessary because the actual dot formation occurs at the ink layer and receiving sheet interface which is blocked from observation by the opaque nature of receiving sheet 18 and ink layer 12. Secondly, by providing the resistance layer inside of the ribbon structure, heat can be generated utilizing spaced electrodes which are located at the outside of the edges of the area of layers 16 where the indicator mark is formed. Thus, the electrodes do not block the indicator mark as would be the case with a more conventional external heat generating print head which is configured to engage the back side of a thermal transfer ribbon.

In the illustrated three layer ribbon 10 the resistive layer 14 serves both as a flexible support for the outside layers 12 and 16 as well as a resistive heating element for effecting ink transfer and activating the thermally sensitive dyes in layer 16 to form a corresponding indicator mark or dot.

Preferably, layer 14 is a polymer or resin film that is loaded with conductive carbon particles to reduce the inherent high resistivity of the film to a lower resistance value that permits sufficient current flow at reasonably low signal voltages to generate the amount of heat required for ink transfer and activation of the thermal dyes in indicator layer 16.

Examples of resistive layer materials suitable for use in ribbon 10 include a polycarbonate film having conductive particulate carbon black therein, or a polymer which is a blend of aliphatic polyurethane and a urethane acrylic copolymer with conductive particulate carbon black. These materials are more fully described in U.S. Pat. No. 4,477,198 and various other patent and technical literature references cited therein.

Alternatively, the resistance layer 14 may itself be in the form of a laminate comprising a polymer support film, such as Mylar or the like, having a coating thereon of an inorganic resistive material, such as a metal silicide as described in U.S. Pat. No. 4,470,714.

Typically, the resistive layer 14 would have a thickness in the range of 10–20 microns and be coated on the front side with a fusible thermo plastic or wax based ink or marking layer 12 having a typical thickness in the range of 2–8 microns. Representative examples of ink layer formulations that may be used in ribbon 10 are disclosed in U.S. Pat. Nos. 4,477,198 and 4,384,797 along with various patent and technical literature references cited therein.

The indicator layer 16 on the back side of ribbon 10 has two required characteristics. First, it must be sufficiently electrically conductive to provide adequate current flow through the thickness of the layer to establish the current flow path I between each of the electrodes 20 and 22 in contact with the outer surface of layer 16, and the underlying resistive layer 14. Also, the material composition must be thermally activatable to produce a visible or optically detectable mark on the back side of the ribbon in response to heat generated by the current flow in resistive layer 14.

One type of material suitable for use in indicator layer 16 comprises a polymer binder having dispersed therein both thermally sensitive indicator components, to provide the indicator function, and electroconductive components for decreasing resistivity of the layer to provide adequate current flow therethrough.

Typically, the thermally sensitive indicator components may take the form of leuco type dyes that are commonly used in thermally sensitive recording papers. The electroconductive component may take the form of a metal iodide such as cuprous iodide or the like. For a more extensive description of various components that may be incorporated into indicator layer 14, reference may be had to U.S. Pat. Nos. 4,905,876; 3,951,757; and 4,133,933. Also see a technical paper entitled "Electrothermo Sensitive Recording Sheets" by W. Shimotsuma et al, Tappi, October, 1976, Vol. 59 No. 10, Pages 92 and 93.

Figure 3:
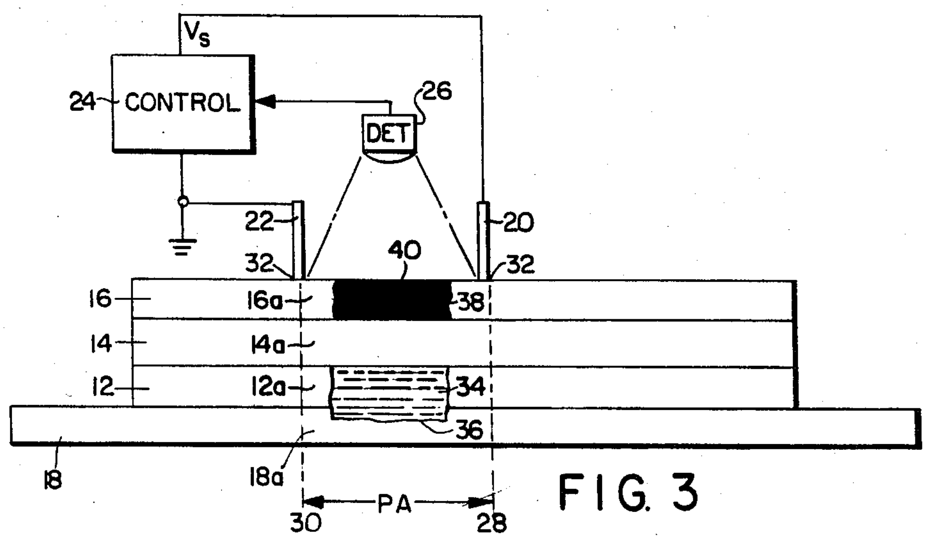
FIG. 3 is similar in most respects to FIG. 2 but shows an ink dot provided from an ink layer on the front side of the ribbon and an indicator mark formed on the back side of the ribbon.

For the purposes of illustration, in FIG. 3 a laterally extending pixel area section PA of ribbon 10 between electrodes 20 and 22 is shown bounded by vertical dotted lines 28 and 30. The corresponding sections of the individual layers within section PA are designated 12*a*, 14*a*, and 16*a*. The corresponding pixel area section of sheet 18 in which a dot is to be formed is designated 18*a*. It should be understood that section PA is intended to be representative of a pixel area section of ribbon 10 which is affected when the current flow path I is established and that the actual size and shape of pixel area section PA will undoutedly vary slightly from the illustrated section bounded by lines 28 and 30.

A preferred method of utilizing ribbon 10 is to provide a pair of electrodes 20 and 22 which have substantially equal surface area ends 32 in contact with the outer surface of layer 16. This is done to induce substantially constant current density in section 14*a* of resistive layer 14 when the current flow path I is established so that heat is generated more or less uniformly across the width of section PA rather than being concentrated in the vicinity of one of the electrodes.

Before the ink in layer 12 will fuse it must be heated to a minimum activation temperature. Likewise, the dyes in indicator layer 16 will not change color until a minimum activation temperature is achieved. Preferably, the compositions forming the ink layer 12 and indicator layer 16 are formulated such that the respective minimum activation temperatures coincide or are at least close together.

In response to amount of heat transmitted from section 14*a* sufficient to obtain the minimum activation temperature, a portion 34 of the ink in section 12*a* fuses and transfers to sheet section 18*a* to form a mark or a dot 36 thereon, and a portion 38 of the thermally sensitive indicator layer in corresponding pixel area section 16*a* changes color to form a visible or optically detectable dot or mask 40 between the electrodes in the field of view of the photodetector 26. Because the reactions in sections 12*a* and 16*a* are triggered by a common heat source, the size of the indicator dot 40 is proportional to the size of the transfer dot 36. The proportionality or density ratio of the two dots may be determined by emperical testing to establish a calibration factor that will be applied to the photodetector reading for calculating the actual size of dot 36 or the density of a pixel area section 18*a* on sheet 18 in which dot 36 is formed.

Unlike prior art thermal transfer systems which are designed primarily to make the dots of uniform size for use in binary (black or white) recording applications such as forming dot matrix characters or graphic symbols, ribbon 10 is designed for use in a system that is capable of varying dot size or pixel density to record tonal or grey scale images. The size of a thermally transferred dot 36 and its corresponding indicator dot 40 is a function of the amount of heat applied to form the dot. That is, dot size progressively increases with increasing amounts of heat applied to form the dot.

Upon initial fusion of ink in section 12*a* and the corresponding activation of the thermally dyes in corresponding pixel area section 16*a*, initial small dots 36 and 40 (compared to the surface area of section PA) are formed. In response to continued heat input, the dot progressively increase in area or "grows". If the heat input is terminated, the dots may grow a little larger due to residual heat in ribbon 10, but then growth will terminate. If the heat input is resumed, upon reaching the minimum activation temperature dot growth will resume. Dot growth continues until a full size dot that approximate the surface area of section PA is formed. Outside of the boundries of section PA, the temperature drops off to a point below the minimum activation temperature causing automatic inhibition of further dot size increase despite the fact that current may still be flowing in the current path I.

Thus, the recorded dots 36 and 40 start out small and progressively increase in size with increased amounts of heat applied to form the dots. The heat application may be continuous, in which case dot size progressively increases without interruption until heat input is terminated, or the dots reach full size; or dot size may be progressively increased in steps by applying a succession of signal voltage pulses to produce corresponding heat input pulses.

While the illustrated ribbon 10 has been described as having only three essential layers 12, 14 and 16, it should be understood that additional layers may be optionally included in the ribbon structure without departing from the spirit and scope of the invention involved herein. It is contemplated that such optional layers would be disposed between resistive layer 14 and the ink layer 12 and/or between resistive layer 14 and the indicator layer 16. Functionally, such optional layers may serve to facilitate ink transfer (e.g. providing an ink release layer next to ink layer 12) and/or enhance or better focus heat transfer from resistive layer 14 to the two outermost layers 12 and 16.

Figure 4:
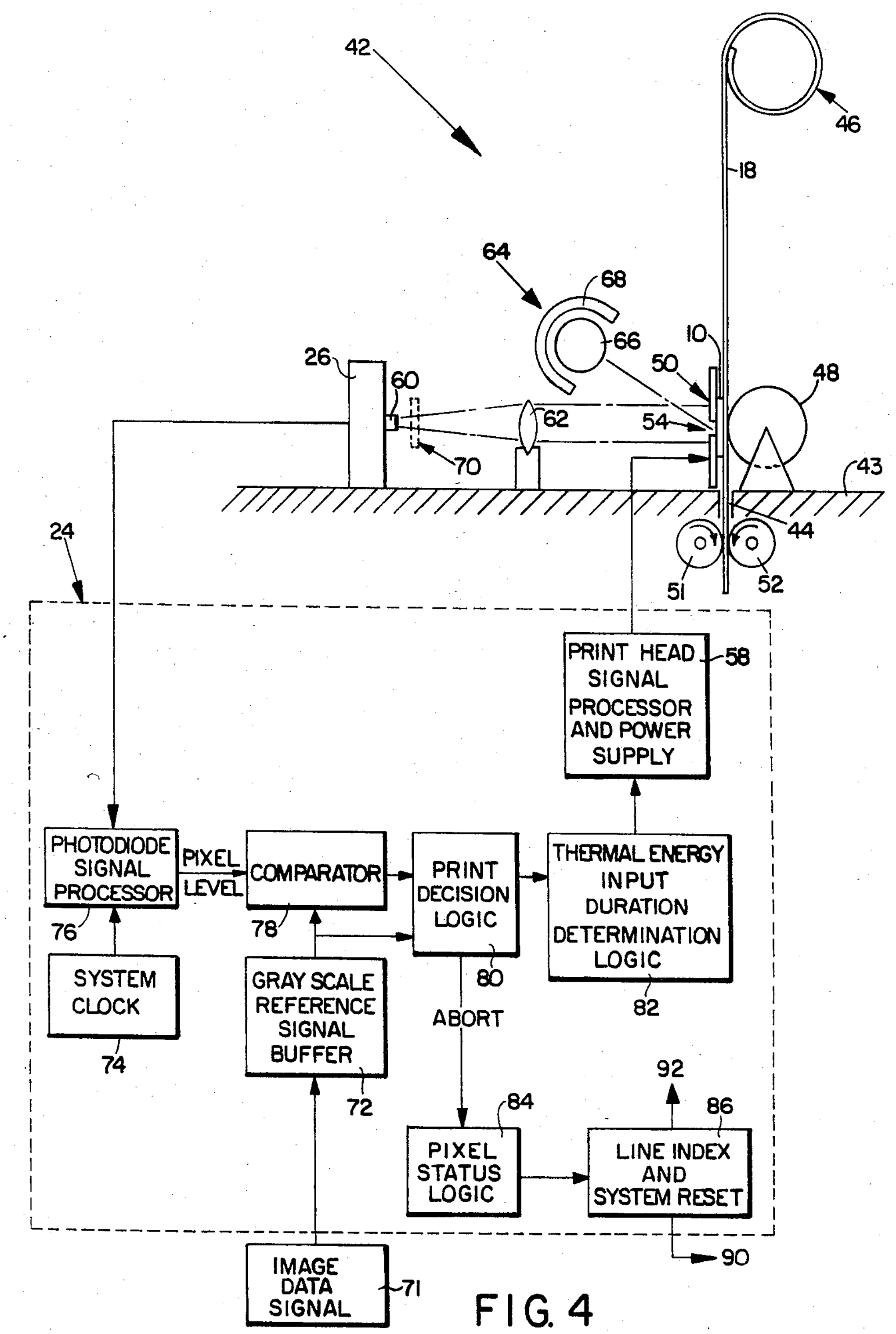
FIG. 4 is a diagrammatic representation of a thermal transfer recording system configured for use with the ribbon of FIG. 1.

A thermal transfer image recording system 42 which is specially configured to utilize ribbon 10 for recording a tonal image on receiving sheet 18 is diagramatically shown in FIG. 4. The illustrated system 42, which is the subject matter of commonly assigned, copending application U.S. Ser. No. (Polaroid Case No. 7076) filed by Irving Erlichman on even date herewith, is of the line recording type in which lines of pixel areas defining the desired image are recorded in sequence.

Various components of system 42 are supported on a horizontal base member 43 having a paper feed through slot 44 therein. The recording sheet 18, in the form of plain white paper is supplied from a roll 46 supported over base member 43. From roll 46, sheet 18 passes between a pressure roller or platen 48, mounted on one side of slot 44, and a laterally extending length of ribbon 10 (extending between supply and take up reels not shown) supported by a print head assembly 50 on the opposite side of slot 44. Below assembly 50, sheet 18 is fed through slot 44 and into the bite of a pair of paper advancing or line indexing rollers 51 and 52. Collectively, these components provide means for supporting sheet 18 in an operative position for image recording.

Figure 5:
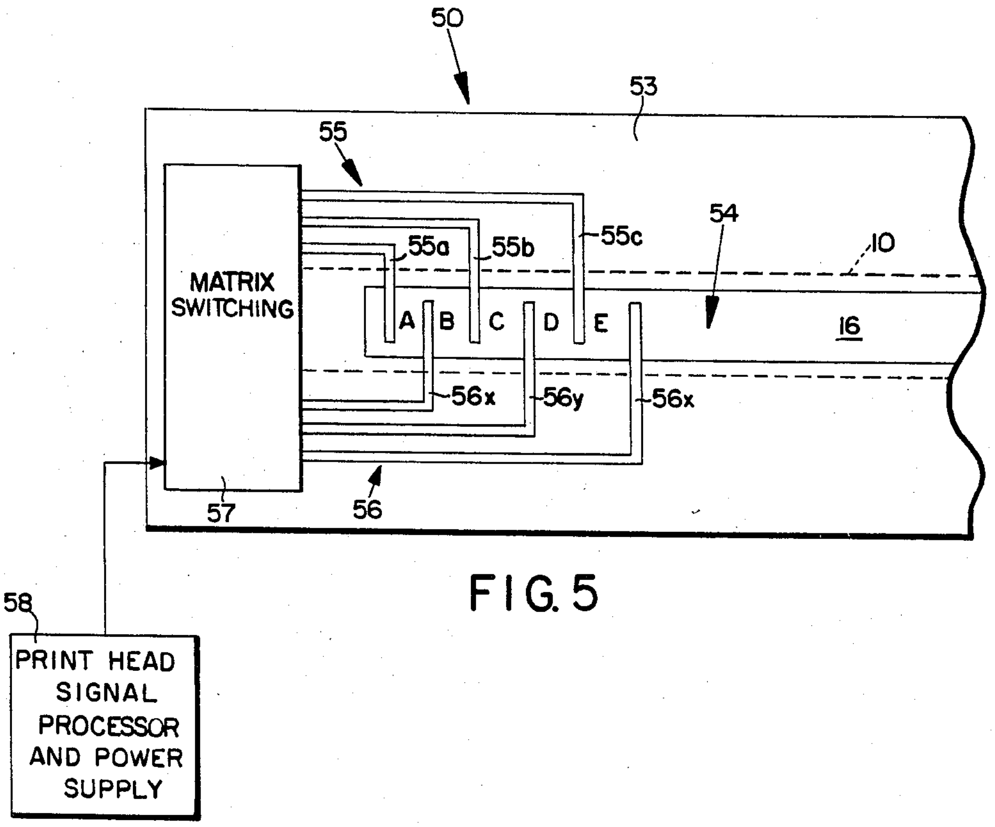
FIG. 5 is a plan view of a portion of a print head assembly that is a component of the recording system of FIG. 4.

As best shown in FIG. 5, the print head assembly 50 comprises a plate-like support 53 made of electrically insulating material. Support 53 has an elongated laterally extending slot or opening 54 therein defining a "window" into which the free ends of a plurality of signal electrodes 55 extend in interdigitated relationship with a plurality of corresponding spaced counter-electrodes 56.

Each of the electrodes 55 and 56 comprises a separate electrical contact having its end opposite the free end contected to a matrix switching device 57 which is operated by a print head signal processor and power supply 58 controlled by control system 24. The ribbon 10 is supported on member 53 so that it overlies window 54 with the free ends of electrodes 55 and 56 in engagement with the indicator layer 16 on the back side of ribbon 10.

To print a dot or mark in pixel area A between the first two electrodes, the recording signal Vs is applied to the first signal electrode **55*a* which is paired with the first counter electrode 56*x*. That is, the print head signal processor 58 operates the matrix switching device 57 so that Vs is applied to electrode 55*a* and the counter electrode 56*x* is lowered to a ground potential relative to $V_s$ so that the current flow path I is established therebetween to generate heat in the corresponding section of resistive layer 14. To selectively print a dot in the next pixel area B, signal voltage $V_s$ is applied to electrode 56*b* which is paired with the first counter electrode 56*x*. A dot is printed in the next adjacent pixel area C by pairing the second signal electrode 56*b* with the next counter electrode 56*y* . . . etc. Additional electrode pairs (not shown) are provided for the entire length of slot 54**. By the use of appropriate software and matrix switching techniques, electrode pairs corresponding to each of the pixel areas in the line can be addressed individually.

Spaced forwardly of print head assembly 50, in registration with the observation window defined by slot 54, is the photocell detector or sensor 26 for optically monitoring the density of each pixel area in the current line to be recorded.

Preferably, detector 26 comprises a linear array of photodiodes (designated 60 in FIG. 4) or the like which are equal in number and spacing to the pairs of adjacent electrodes 55 and 56 on assembly 50 for receiving reflected light from corresponding pixel area sections of layer 16 between electrodes. However, if the size or spacing of the photodiodes 60 differs from those of the electrode pairs, it is preferable to provide a compensating optical component between the line of photodiodes 60 and the observation window 54 to maximize efficiency of the dot monitoring process.

One type of commercially available detector 26 that is suitable for use in system 42 is the series G, image sensor marketed by Reticon Corp. The photodiode array has a pitch of 1000 diodes per inch. If it is used in conjunction with a print head assembly 50 that has 200 electrode pairs per inch, this means that a pixel area is 5 times larger than the photodiode area so the photodiode will not "see" the entire pixel area. This condition may be corrected by locating an objective lens 62 in the optical path which serves to provide a focused image of the larger pixel area on the smaller size photodiode.

While it is possible to sense the level of ambient light reflected from the portions of layer 16 registered with slot 54, it is preferable to provide supplemental illumination for this area in the interest of improving efficiency and obtaining consistent and reliable density readings.

In the illustrated embodiment, system 42 includes an illumination source 64, in the form of a lamp 66 and associated reflector 68, positioned in front of and above assembly 50 for directing light onto the strip of layer 16 registered in the observation window 54. Because photodiodes tend to be very sensitive to infrared wavelengths, it is preferable to use a lamp 66, such as a fluorescent lamp, that does not generate much infrared radiation to prevent overloading the photodiodes with energy outside of the visible light band that carries pixel density information. Alternatively, if the type of lamp 66 selected for use does include a significant infrared component in its spectral output, an optional infrared blocking filter 70 (shown in dotted lines) may be located in front of the photodiodes 60 to minimize erroneous readings.

In FIG. 4, functional components of the control system 24 are shown in block diagram form within the bounds of a dotted enclosure 24.

In preparation for recording a monochromatic image on sheet 18, electronic image data input signals 71 defining the pixel by pixel density of the image matrix are fed into means for receiving these signals, such as a grey scale reference signal buffer memory 72. Preferably, the image signals are in digital form provided from an image processing computer or digital data storage device such as a disk or tape drive. If the electronic image signals were originally recorded in analog form from a video source, it is preferable that they undergo analog to digital conversion, in a manner that is well known in the art, before transmission to buffer 72. Alternatively, as noted earlier, control system 42 may optionally include an analog to digital signal conversion subsystem for receiving analog video signals directly and converting them to digital form within control system 24. Preferably, buffer 72 is a full frame image buffer for storing the entire image, but it also may be configured to receive portions of the image signals sequentially and for this purpose buffer 72 may comprise a smaller memory storage device for holding only one or two lines of the image.

Thus, control system 24 includes means for receiving electronic image signals which it utilizes as grey scale reference signals that define desired or target pixel densities for comparison with observed density signals provided from the optical monitoring photodiode detector 26 in the feedback loop.

The operation of control system 24 is coordinated with reference to a system clock 74 which among other things sets the timing for serially reading the light level or pixel density signals from each of the photodiodes 60 in the linear array. Light level signals from detector 26 are fed into a photodiode signal processor 76 which converts analog signals provided from detector 26 to digital form. Alternatively, this A/D conversion may take place in a subsystem incorporated into detector 26.

Density signals from processor 76 along with reference signals from buffer 72 are fed into a signal comparator 78 which provides signals indicative of the comparison to a print decision logic system 80. Based on the comparison information, system 80 provides either a print command signal or an abort signal for each pixel in the current line. Print command signals are fed to a thermal input duration determining logic system 82, and abort signals are fed to a pixel status logic system 84.

Upon receiving a print command, system 82 utilizing look-up tables therein to set the time period for energizing each of the electrode pairs that are to be activated and feeds this information to the print head signal processor and power supply 58 which acutates the selected electrodes in accordance with these instructions.

The abort signals to system 84 keeps track of which pixels have been recorded and those that yet need additional thermal input for completion. When abort signals have been received for every pixel in the current line being printed, system 84 provides an output signal to a line index and system reset system 86.

System 86 provides a first output signal designated 90 which actuates a stepper motor (not shown) for driving the paper feed rollers 51 and 52 to advance sheet 18 one line increment in preparation for recording the next image line. Signal 90 also actuates another stepper motor (not shown) for driving the ribbon take-up reel to provide a fresh length of ribbon 10 over window 84. Additionally, system 86 puts out a reset signal, designated 92, for resetting components of control system in preparation for recording the next line.

In the elongated array of photodiodes 60, most likely there will be some variations in output or sensitivity among the individual photodiodes 60. However, during factory calibration variations may be noted and correction factors may be easily applied in the form of a calibration software program to compensate for such variations. Likewise, variations in the voltage output characteristics of each of the electrode pairs in print head assembly 50 may be determined by calibration measurement and corrected with a compensating software program that automatically adjust energization times of the individual electrode to produce uniform voltage outputs across the array.

In the operation of recording system 42, a thermal recording cycle is initiated by actuation of the print decision logic system 80. Actuation may be accomplished by the operator manually actuating a start button (not shown).

In response to actuating system 80, grey scale reference signals indicating the desired or target densities of all of the pixels in the first line are sent from buffer 72 to system 80. System 80 evaluates this information and for those pixel areas in which no dot is to be recorded, so as to represent the lightest tone in the grey scale, abort signals are sent to the pixel status logic system 84. Print command signals for those pixel areas in which a dot is to be printed are transmitted from system 80 to system 82. System 82, using the look-up tables, provides initial thermal input duration signals indicative of the time period that each electrode pair is to be energized to print an initial dot 36 in its corresponding pixel area PA on sheet 18 and form a corresponding indicator mark 40 in the corresponding pixel area section of layer 16.

To minimize the length of the line recording cycle, it is preferable that the initial dot be smaller than the final dot size but large enough so that the number of successive thermal energy applications needed to to make a dot of the required size is not excessive.

For example, system 82 will provide initial thermal input time signals to form an initial dot 36 and corresponding indicator mark 40 that is approximately 75%–85% of the final or desired dot size. This means, that each initial dot will be smaller than the pixel area in which it is formed. Even if the reference signals indicate that a high density dot which substantially fills the pixel area is to be recorded, initially a smaller dot will be formed to trigger formation an optically detectable indicator mark 40 for feedback loop utilization to achieve precise control over dot size or pixel density.

The initial duration signals are fed from system 82 to the print head signal processor and power supply 58 which is capable of addressing each of the electrode pairs in print head assembly 50 and applying signal voltage $V_s$ thereto for the initial times indicated.

The selected electrode pairs 55 and 56 apply voltage $V_s$ to the indicator layer 16 on the back of ribbon 10 causing heat generating current to flow in the corresponding selected sections of resistive layer 14. In response to this heat, ink in sections of layer 12 corresponding to the selected pixel areas is fused and transfers to sheet 18 to form the initial dots 36 in the selected pixel area and the thermally sensitive dyes in the corresponding opposite pixel area sections of layer 16 are activated to form corresponding initial indicator dots or marks 40 that are proportional to dots 36. The initial indicator dots 40 are visible through the slot or window 54 and the density or reflected light level of each corresponding pixel area section PA of layer 16 between adjacent electrodes is read by the photodetector 26. These density signals, which are indicative of pixel density on sheet 18, are transmitted to signal processor 76 which provides the pixel density signal indications to comparator 78 for comparing the initial pixel density with the target density signals provided from reference signal buffer 72.

Correlating the photodiode output signals to the refelective characteristics of the back side layer 16 of any particular type of ribbon 10 may be done by taking test readings on a blank ribbon 10 to establish a reference signal level for highest reflectivity which is indicative of the lowest density or brightest pixel in the grey scale. As a preferable alternative, the setting of the reference level may be built into the recording cycle by having system 42 automatically take a photocell reading of the corresponding pixel area sections PA on layer 16 registered in the observation window 54 prior to energizing the print head to record the initial dots 36 and corresponding indicator marks 40.

As noted earlier, additional dot and indicator mark growth may occur subsequent to deenergization of the electrode pairs in print head assembly 50 due to residual heat attributable to the thermal inertia of the ribbon structure. Therefore, it is preferable to delay the photodetector reading for a short time after the electrode pairs are deenergized so that any additional growth will be included in this reading.

The pixel density readings are compared to the reference signals by comparator 78 which supplies signals indicative of the difference therebetween to the print decision logic system 80. Because the initial dot size was calculated to be smaller than the final dot size the vast majority of the differential signals will indicate that additional thermal input is necessary to make each of the dots slightly larger. However, because of the variability of thermal recording parameters, at least some of the dots may have reached desired size even though the initial thermal input was intended to create a dot of only 75%-85% of desired size. For these pixels, system 80 provides abort signals to the pixel status system 84 and terminate any further thermal input thereto during the next portion of the recording cycle.

For those pixels that have not yet reached the target or desired density, system 80 will issue print commands to system 82 which will then provide signals indicative of the time needed to produce additional dot growth. Because the objective is now to make the dots only a little bit larger than initial size, the duration of electrode pair energization will be shorter than the times used to record the larger initial dots.

The selected electrode pairs are energized and, following a short delay for thermal stabilization, the photodiodes 60 once again read the level of light reflected from layer 16 and feed the signals back to the comparator 78 to test these readings against the reference levels. Again, the system 80 recycles in this manner with abort signals being provided for those dots that have reached their target size and print commands being provided for pixel areas that need additional thermal input to bring their density up to target level. Once the pixel status system 84 indicates that all of the pixels in the line are at target density, system 84 triggers the line index and reset system 86 which causes the paper to be moved one line increment; the ribbon 10 to be advanced; and various control components to be reset in preparation for recording the next image line.

Thus, a typical line recording cycle comprises the steps of sensing the reflected light level of corresponding pixel area sections of layer 16 registered in the observation window to establish an initial reference level indicative of the lowest density pixel; in accordance with the grey scale reference signals, energizing selected electrode pairs to record initial dots in selected pixel areas which are smaller than necessary to achieve target density; following a delay to allow for additional dot growth due to heat build up and thermal inertia, sensing the reflected light level of the back side of ribbon 10 where the indicator dots 40 are formed to measure or observe the density of the initial dots; comparing the observed density with the target density; and based on this comparison initiating the application of additional thermal energy to those pixel areas which require larger dots to bring them up to target density and also terminating further input of thermal energy to those pixel areas where the comparison indicates that a predetermined comparison value has been achieved.

If, for example, the monitored density is very close to the target density, say in the range of 92 to 98% of target, it may be very difficult to tailor the next round of thermal input to that pixel area of the ribbon to achieve the very small amount of additional growth needed to reach target density. Therefore, rather than risk making the dot larger then needed to achieve an exact match with target density, it would be preferable to abort any further application of thermal energy to that particular pixel area.

In the above described process, the desired dot in each pixel area is formed in steps. First an initial dot is made and the corresponding pixel area section of layer 16 is measured for comparison against the grey scale reference signal then, if necessary, one or more additional short pulses of thermal energy are sequentially applied for that pixel area to bring it up to its target density. Through the use of feedback, dot size can be controlled to a much higher degree than if this system were to simply operate in an open loop manner with dot size being correlated to the duration of thermal energy input for each pixel area.

As an alternative to the stepwise mode of operation, system 42 may be configured for continuous power application with feedback monitoring of dot formation. In this case, the electrode pairs corresponding to the pixel areas PA in the line that are to have dots recorded therein in accordance with the grey scale reference signals are all turned on simultaneously. As the indicator dots 40 appear and continue to grow, pixel density is continuously monitored and compared to the reference levels. When the predetermined comparison value is achieved for a given pixel area, the system automatically deenergizes its corresponding electrode pair. While this mode of operation may shorten the recording cycle somewhat compared to the stepwise dot formation cycle, the degree of control over dot size may not be as great because additional dot and indicator mark growth due to thermal inertia of ribbon 10 is not accounted for in the control provided by the feedback loop. A certain amount of additional growth may be anticipated and the heating elements could be turned off at a lower predetermined value of comparison to provide some compensation for this additional dot growth. However, it would seem that the higher degree of accuracy provided by the stepwise method may be preferable unless there is an urgent need to reduce recording cycle time.

While the illustrated embodiment of recording system 42 has been portrayed as line recording system, it is within the scope of the invention to modify this system for scanning mode operation wherein a print head assembly 50 and accompanying photodetector 26 that are narrower than a full line are moved back and forth across the width of a paper to effect image recording. Also, the print head assembly and photodetector may be configured to record on more than one line or to record the entire image so as to minimize or eliminate the need for relative movement between the components of the recording system and the thermally sensitive recording medium.

While in the illustrated embodiment, sensing or monitoring of the indicator marks 40 is achieved with an electro-optical photodetector operating in the visible light band, it is within the scope of the invention to modify the system and employ other types of detectors which may operate at other wavelengths or may include other types of structures (for example fiber optics) to monitor recorded pixel density.

Because certain other modifications or changes may be made in the above described thermal transfer ribbon, recording system and method without departing from the spirit and scope of the invention involved herein, it is intended that all matter contained in the above description or shown in the accompanying drawings be interpreted as illustrative and not in a limiting sense.

What is claimed is:

1. A thermal transfer ribbon comprising:
   - a thermally transferable ink layer;
   - a thermally sensitive and electro-conductive indicator layer; and a resistive layer for generating heat in response to electrical current flow therein, said resistive layer being located between and in thermally conductive relation to both said ink and indicator layers so that heat generated in said resistive layer flows to both said ink and indicator layers for activating ink in said ink layer to effect transfer and for activating a corresponding section of said indicator layer to form therein an optically detectable indicator mark that is proportional to ink transfer from said ink layer; said ribbon being configured such that electrical signals applied to a portion of said indicator layer between a pair of spaced apart electrodes in contact therewith causes generation of heat in a portion of said ribbon between said pair of electrodes and said portion of said indicator layer functions to indicate while said pair of electrodes are in contact therewith.

2. The thermal transfer ribbon of claim 1 wherein said ink layer is supported one side of said resistive layer and said indicator layer is supported on an opposite side of said resistive layer.

3. The thermal transfer ribbon of claim 2 wherein said ink layer is configured to be located in engagement with an ink receiving sheet and said ink layer is of the fusible type wherein said ink fuses in response to application of heat from said resistive layer and transfers to the receiving sheet to form a dot thereon.

4. The thermal transfer ribbon of claim 3 wherein said indicator layer includes thermally activatable components which turn color in response to heat provided from said resistive layer to form said indicator mark.

5. The thermal transfer ribbon of claim 4 wherein a dot formed by transfer of ink to the receiving sheet and a corresponding indicator mark formed in said indicator layer increase in size with increasing amounts of heat applied to form such a dot and mark.

6. The thermal transfer ribbon of claim 1 wherein said resistive layer comprises a polymer film having conductive components incorporated therein to lower the inherent resistivity of said film.

7. The thermal transfer ribbon of claim 1 wherein said indicator layer comprises a polymer binder having dispersed thereon one or more thermally sensitive dyes and one or more components for lowering the resistivity of said binder to make it electro-conductive.

8. The thermal transfer ribbon of claim 1 wherein said ink layer is on a front side of said ribbon and is configured to engage a receiving sheet to effect ink transfer thereto to form a dot in a manner whereby dot formation is obscured by the receiving sheet, and said indicator layer is on the back side of said ribbon where formation of a indicator mark is not obscured and is visible for optical detection.

9. The thermal ribbon of claim 1 wherein an indicator mark is formed in a section of said indicator layer that is in alignment with an opposite corresponding section of said ink layer in which ink is activated for transfer.

10. A thermal transfer ribbon for use with a thermal transfer recording system for recording a grey-scale image on an ink receiving sheet and including an optical detector as part of a feed back system for controlling recorded dot size; said ribbon comprising:

a thermally transferable ink layer configured to engage such an ink receiving sheet;

a thermally sensitive and electro-conductive indicator layer; and a resistive layer for generating heat in response to electrical current flow therein, said resistive layer being located between and in thermally conductive relation to both said ink and indicator layers so that heat generated in said resistive layers flows to both said ink and indicator layers for activating ink in said ink layer to effect transfer to the receiving sheet thereby recording a dot thereon, and for activating a corresponding section of said indicator layer to form therein an optically detectable indicator mark which is proportional to said recorded dot and is accessible for detection by the recording system detector; said ribbon being configured such that electrical recording signals applied to a portion of said indicator layer between a pair of spaced apart electrodes in contact therewith causes generation of heat in a portion of said ribbon between said pair of electrodes and said portion of said indicator layer functions to indicate while said pair of electrodes are in contact therewith.

11. The thermal transfer ribbon of claim 10 wherein said ink layer is supported on one side of said resistive layer and said indicator layer is supported on an opposite side of said resistive layer.

* * * * *